United States Patent [19]
Shiratori et al.

[11] Patent Number: 6,096,451
[45] Date of Patent: Aug. 1, 2000

[54] SOLID-ELECTROLYTE FUEL CELL

[75] Inventors: Akira Shiratori, Shiga-ken; Michiaki Iha, Kusatsu; Hiroshi Takagi, Otsu, all of Japan

[73] Assignee: Murata Manufacturing Co., Ltd., Japan

[21] Appl. No.: 09/124,569

[22] Filed: Jul. 29, 1998

[30] Foreign Application Priority Data

Aug. 21, 1997 [JP] Japan ................................. 9-225062

[51] Int. Cl.⁷ .................................................. H01M 8/12
[52] U.S. Cl. .................................. 429/36; 429/33; 429/36
[58] Field of Search ................................. 429/36, 35, 33

[56] References Cited

U.S. PATENT DOCUMENTS

| | | | |
|---|---|---|---|
| 4,781,727 | 11/1988 | Mitsuda et al. | 429/35 X |
| 5,385,792 | 1/1995 | Shiratura et al. | 429/36 X |
| 5,585,203 | 12/1996 | Chikagawa et al. | 429/36 X |

FOREIGN PATENT DOCUMENTS

| | | |
|---|---|---|
| 0675557A1 | 10/1995 | European Pat. Off. . |
| 2735934B2 | 2/1979 | Germany . |
| 4242728A1 | 6/1994 | Germany . |

*Primary Examiner*—John S. Maples
*Attorney, Agent, or Firm*—Ostrolenk, Faber, Gerb & Soffen, LLP

[57] ABSTRACT

A solid-electrolyte fuel cell stack comprises three-layered films and separators alternately stacked with each other. Each of the three-layered films comprises a solid-electrolyte film, a fuel electrode and an air electrode with the solid-electrolyte film interposed between the fuel electrode and the air electrode. The three-layered film and the separator are bonded together with a glass bonding agent and a ceramic bonding agent separately interposed therebetween.

16 Claims, 2 Drawing Sheets

SOLID-ELECTROLYTE FUEL CELL

BACKGROUND OF THE INVENTION

1. Field of the Invention

The present invention relates to solid-electrolyte fuel cells.

2. Description of the Related Art

A solid-electrolyte fuel cell directly converts chemical potential contained in fuel into electric energy by an electrochemical means.

FIG. 1 is a sectional view of a cell stack of a solid-electrolyte fuel cell in which, for example, three cells are stacked.

A cell 1a is a minimum unit for generating electricity by the reaction of the solid-electrolyte fuel and includes a three-layered film 2a as a generating section and a pair of separators 3a and 3b which sandwich the three-layered film 2a from both sides. The three-layered film 2a includes an air electrode 4a, a solid-electrode film 5a, and a fuel electrode 6a. A stack including a plurality of cells 1a is referred to as a cell stack 7a.

The solid-electrode film 5a is rectangular, and as its material, for example, yttria-stabilized-zirconia (YSZ) is used. As a material for the air electrode 4a, for example, lanthanum manganite ($LaMnO_3$) is used and as a material for the fuel electrode 6a, for example, a cermet including nickel (Ni) and yttria-stabilized-zirconia (YSZ) is used.

For the separators 3a and 3b, for example, lanthanum chromite ($LaCrO_3$) is used. Air is fed into the air electrode 4a of the three-layered film 2a through a groove 8a functioning as a gas channel, and fuel gas is fed into the fuel electrode 6a through a groove 8b functioning as a gas channel. The adjacent cells 1a are electrically connected to each other. In the cell 1a shown in FIG. 1, air and fuel gas flow on either surface of the three-layered film 2a.

FIG. 2 shows another example of a solid-electrolyte fuel cell. In FIG. 2, a separator 3c is joined to the side of an air electrode (not shown in the drawing) of a three-layered film 2b which includes the air electrode, a solid-electrolyte film, and a fuel electrode to constitute a cell 1b. A plurality of the cells 1b are stacked, and a conductive felt layer 14 provided with a fuel gas channel is placed between a fuel cell (not shown in the drawing) of one cell 1b and a separator 3c of another cell 1b lying on the fuel cell. In such a cell, air is fed into the separator 3c which is joined to the air electrode of the three-layered film 2b, and fuel gas is fed into the conductive felt layer 14 on the side of the fuel cell. The fuel electrode of the cell 1b and the separator 3c lying on the fuel electrode are electrically connected by the conductive felt layer 14, and thus, a cell stack 7b is constituted. A sealant composed of glass or a composite material, for example, including ceramic and glass is used for the peripheries of the separator 3c and for the outer sides of the conductive felt layer 14 along the fuel gas channel. The sealant also prevents the fuel gas from leaking out of the fuel cell.

An advantage of such a flat-type solid-electrolyte fuel cell is a high output per unit volume. By decreasing the thickness of the three-layered film, the number of cells per unit thickness can be increased, and also since electric current flows perpendicular to the cell plane, the internal resistance can be reduced.

The structure of the solid-electrolyte fuel cell described above requires that no leakage of gas occur where the three-layered film and the separator are joined to each other so that the air and fuel gas fed do not mix. For the purpose of sealing gas, a glass bonding agent or a glass-ceramic composite bonding agent is generally used.

With respect to these bonding agents, however, since glass softens at the operating temperature (800° C.–1,000° C.) of the solid-electrolyte fuel cell, the bonding strength between the three-layered film and the separator weakens. Thus, during the operation or the temperature-rising period of the solid-electrolyte fuel cell, the three-layered film and the end of the separator separate and the ability to seal gas decreases.

For the forgoing reasons, there is a need for a solid-electrolyte fuel cell which has adhesiveness to prevent the three-layered film and the end of the separator from separating and which has the ability to seal gas during the operation or the temperature-rising period of the solid-electrolyte fuel cell.

SUMMARY OF THE INVENTION

The present invention is directed to a solid-electrolyte fuel cell that satisfies the aforementioned need. The solid-electrolyte fuel cell comprises one or more three-layered films and separators alternately stacked with each other. Each of the three-layered films comprises a solid-electrolyte film, a fuel electrode and an air electrode with the solid-electrolyte film interposed between the fuel electrode and the air electrode. The three-layered film and the separator are bonded together with a glass bonding agent and a ceramic bonding agent separately interposed therebetween.

Each of the separators preferably has a groove at an end section thereof along a fuel gas or air channel such that the groove divides the end section into an inside section and an outside section, and either the glass bonding agent or the ceramic bonding agent is placed in the inside section of the separator and the other is placed in the outside section of the separator.

The three-layered film and the separator may be bonded together such that the air electrode faces the separator. In this case, a portion of the air electrode is preferably removed such that the solid-electrolyte is exposed at a region corresponding to the end section.

In accordance with the present invention, with the structure described above, the glass bonding agent is used for sealing gas and the ceramic bonding agent is used for bonding, and thus, they function independently. Accordingly, the three-layered film and the end of the separator do not separate, and the ability to seal gas well can be obtained.

Also, in accordance with the present invention, since a groove is provided on the end of the separator and the glass bonding agent and the ceramic bonding agent are isolated by the groove, mixing of the glass bonding agent and the ceramic bonding agent can be prevented. Accordingly, the gas-sealing function of the glass bonding agent and the bonding function of the ceramic bonding agent are performed effectively.

Accordingly, during the operation and the temperature-rising period of the solid-electrolyte fuel cell, the three-layered film and the end of the separator do not separate, and the ability to seal gas in order to prevent gas leakage can be obtained, and thus, a stable solid-electrolyte fuel cell having excellent galvanic characteristics can be obtained.

For the purpose of illustrating the invention, there is shown in the drawings several forms which are presently preferred, it being understood, however, that the invention is not limited to the precise arrangements and instrumentalities shown.

DETAILED DESCRIPTION OF PREFERRED EMBODIMENTS

Hereinafter, the preferred embodiments of the present invention are explained in detail with reference to the drawings.

EXAMPLE 1

Figure 1:
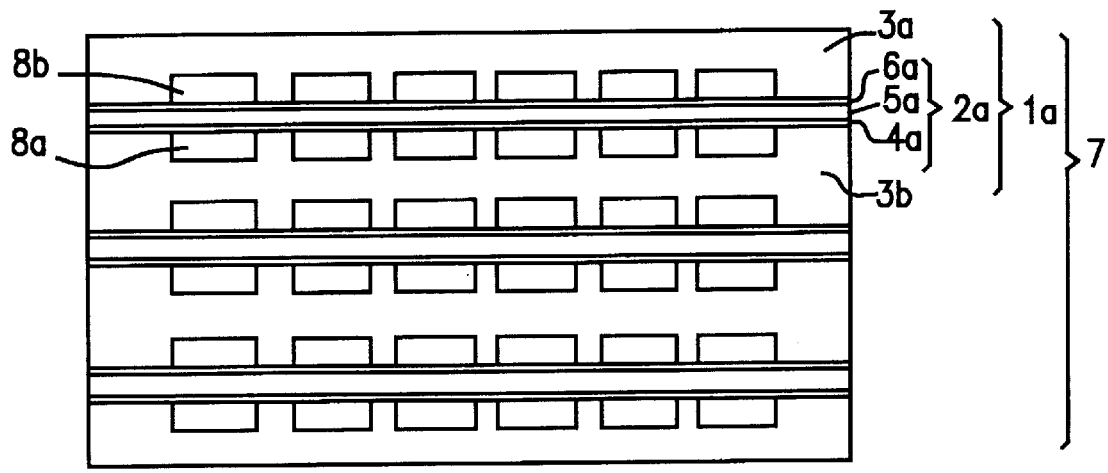
FIG. 1 is a sectional view showing a cell stack of a flat-type solid-electrolyte fuel cell.
Figure 2:
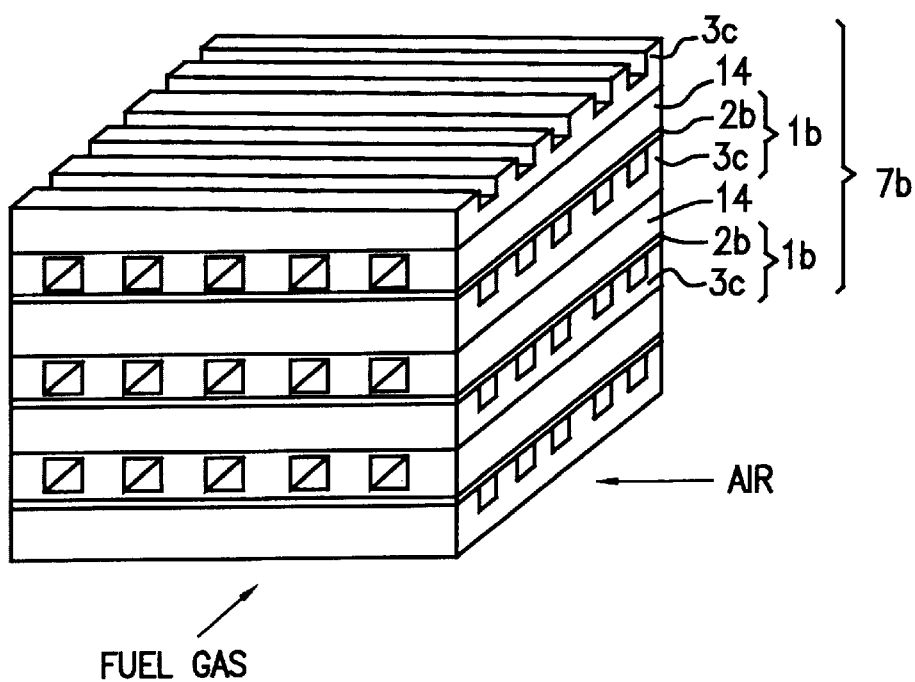
FIG. 2 is a perspective view showing a cell stack of a flat-type solid-electrolyte fuel cell.
Figure 3:
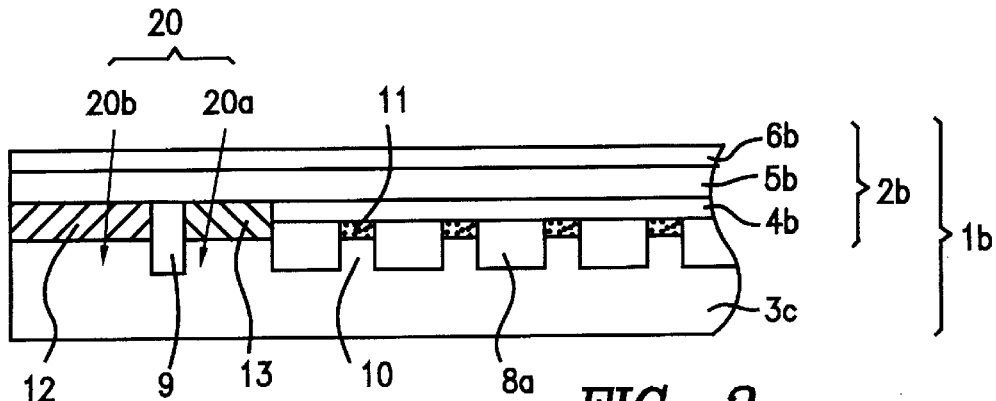
FIG. 3 is a partial sectional view showing the bonding state between a three-layered film and a separator in accordance with a first example.

FIG. 3 shows a partial sectional view of a cell 1b of a solid-electrolyte fuel cell stack according to a preferred embodiment of the present invention.

The cell 1b comprises a three-layered film 2b for a generating section and a separator 3c. The three-layered film 2b includes a solid-electrolyte film 5b, a fuel electrode 6b and an air electrode 4b. The fuel electrode 6b and the air electrode 4b are formed on the opposite surfaces of the solid-electrolyte film 5b.

The separator 3c has a plurality of grooves 8a extending in a direction on the surface thereof and end sections 20 provided on both sides of the plurality of grooves 8a. Conductive sections 10 in a ridge shape are formed between the grooves 8a. Each end section 20 has a groove 9 in the direction along the grooves 8a, whereby the end section 20 is divided into an inside section 20a and an outside section 20b.

The three-layered film 2b and the separator 3c are bonded with a glass bonding agent 12, a ceramic bonding agent 13 and perovskite conductive oxide 11 respectively interposed between the outside section 20b, inside section 20a and the conductive section 10 of the separator 3c and the corresponding sections of three-layered film 2b. In this case, the air electrode 4b of the three-layered film 2b faces the separator 3c, but the a portion of the air electrode 4b is removed so that the solid-electrolyte film 5b is exposed in the region corresponding to the end section 20 of the separator 3c.

Hereinafter, a method for producing the cell 1b will be described.

First, as a solid-electrode film 5b, a thin-film composed of stabilized $ZrO_2$ containing 8 mole % of $Y_2O_3$ in a size of 120 mm×120 mm×0.3 mm was prepared.

Next, as a material for a fuel electrode 6b, NiO and stabilized $ZrO_2$ powder containing 8 mole % of $Y_2O_3$ was prepared, and as a material for an air electrode 4b, (La, Sr)$MnO_3$ powder was prepared. Electrode pastes of the fuel electrode and the air electrode were produced with the electrode powder materials by using an organic binder and an organic solvent.

Then, the fuel electrode paste was applied onto one surface of the solid-electrolyte film 5b and the air electrode paste was applied onto the other surface by screen-printing, and they were baked to form a fuel electrode 6b and an air electrode 4b, and thus, a three-layered film 2b was obtained.

A portion of the air electrode 4b is then removed so that the solid-electrolyte film 5b is exposed at the region corresponding an end section 20 of the separator 3c which will be formed later. This is because the solid-electrolyte film 5b has the better bonding characteristics with the glass bonding agent and the ceramic bonding agent.

On the other hand, (La, Sr)$CrO_3$ ceramic was used for a separator 3c, and grooves 8a as an air channel were provided on one surface of the separator 3c, thereby forming end sections 20 on the both side of the grooves 8a. Also, a groove 9 was provided along the air channel at the end section 20 of the separator 3c which comes into contact with the solid-electrolyte film 5b of the three-layered film 2b, whereby the end section 20 is divided into an inside section 20a and an outside section 20b. The groove 9 has a function of isolating the glass bonding agent and the ceramic bonding agent from each other so they will not be mixed during the heat-treatment for bonding the three-layered film 2b and the separator 3c together and during the operation of the fuel cell.

Next, the three-layered film 2b and the separator 3c were joined together. More specifically, a perovskite conductive oxide 11 was applied onto a conductive section 10 by screen-printing in order to join the air electrode 4b of the three-layered film 2b and the conductive section 10 of the separator 3c. Also, in order to join the three-layered film 2b and the end of the separator 3c, a perovskite ceramic bonding agent 13 was screen-printed onto the inside section 20a, and an aluminum silicate glass bonding plate 12 which had been formed by heat-treatment was applied onto the outside section 20b. The three-layered film 2b and the separator 3c were joined by a heat-treatment while applying a load such that the surface of the separator 3c having the groove 8a for feeding air and the air electrode 4b of the three-layered film 2b were brought into contact with each other, and thus a cell 1b was fabricated. When the glass bonding agent 12 is arranged on the outside section 20b, preferably the width of the glass bonding agent 12 shown in the sectional view is narrowed without affecting the gas-sealing function so that the part does not separate from the three-layered film 2b because of warping by thermal stress.

Next, a plurality of cells 1b were deposited and the adjacent cells were joined to each other with a conductive felt layer therebetween (not shown in the drawing). That is, the lower surface of the separator in one cell and the surface of the fuel electrode in the other cell were joined to each other with a conductive felt layer therebetween. The conductive felt layer also has a function of efficiently collecting the charges generated from the fuel electrode by electrically connecting a fuel electrode and a separator.

A cell stack (not shown in the drawing) was structured as described above to fabricate a solid-electrolyte fuel cell. The solid-electrolyte fuel cell was operated, and from the galvanic characteristics during the operation, it was confirmed whether or not gas leakage occurred between the three-layered film 2b and the end of the separator 3c shown in FIG. 3. Also, after the operation, whether or not the three-layered film 2b and the end of the separator 3c had separated was visually confirmed.

EXAMPLE 2

Figure 4:
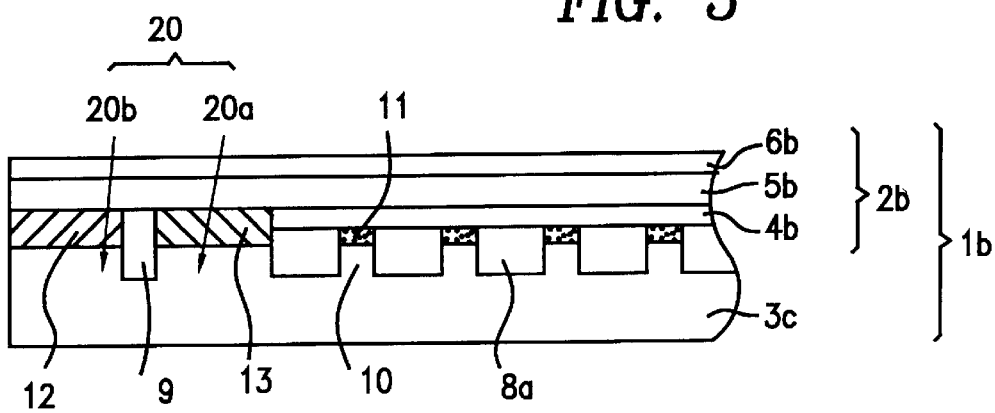
FIG. 4 is a partial sectional view showing the bonding state between a three-layered film and a separator in accordance with a second example.

FIG. 4 is a partial sectional view of a cell in accordance with a second example. A three-layered film 2b including an air electrode 4b, a solid-electrolyte film 5b and a fuel electrode 6b, and a separator 3c were prepared similarly to the first example. In order to join the air electrode 4b of the three-layered film 2b and a conductive section 10 of the separator 3c together, the same conductive oxide 11 as that in the first example was screen-printed onto the conductive section 10. Also, in order to join the three-layered film 2b and the end of the separator 3c together, the same ceramic bonding agent 13 as that in the first example was screen-printed onto the outside section 20b which had been pre-made in the end section 20 of the separator 3c, and the same glass bonding plate 12 as that in the first example was applied onto the inside section 20a. The three-layered film 2b and the separator 3c were joined by a heat-treatment while applying a load such that the surface of the separator 3c having a groove 8a for feeding air and the air electrode 4b of the three-layered film 2b were brought into contact with each other, and thus a cell 1b was fabricated. A cell stack (not shown in the drawing) was structured similarly to the first example to fabricate a solid-electrolyte fuel cell.

The solid-electrolyte fuel cell was operated, and from the galvanic characteristics during the operation, it was confirmed whether or not gas leakage occurred between the three-layered film 2b and the end of the separator 3c. Also, after the operation, whether or not the three-layered film 2b and the end of the separator 3c had separated was visually confirmed.

COMPARATIVE EXAMPLE 1

For comparison, the three-layered film and the separator were joined together by using either a glass bonding agent or a ceramic bonding agent. Therefore, in comparative examples, a groove for preventing mixture of the glass bonding agent and the ceramic bonding agent provided on the end of the separator in the first and second examples was not made.

Figure 5:
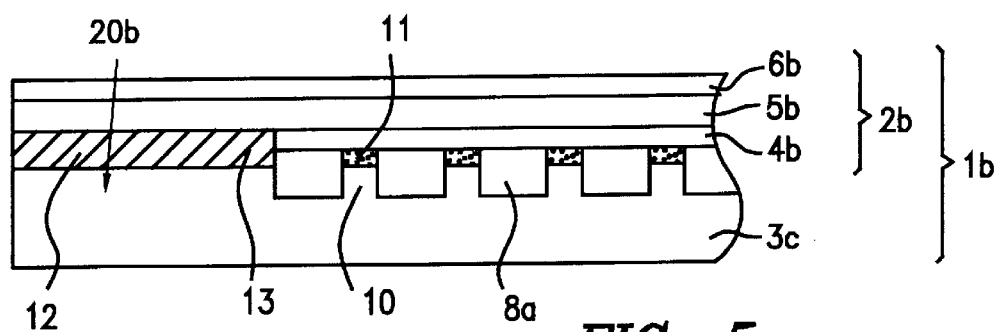
FIG. 5 is a partial sectional view showing the bonding state between a three-layered film and a separator in accordance with a first comparative example.

FIG. 5 is a partial sectional view of a cell in accordance with a first comparative example. A three-layered film 2b including an air electrode 4b, a solid-electrolyte film 5b and a fuel electrode 4b, and a separator 3c were prepared similarly to the first example. In order to join the air electrode 4b of the three-layered film 2b and a conductive section 10 of the separator 3c together, the same conductive oxide 11 as that in the first example was screen-printed onto the conductive section 10. Also, in order to join the three-layered film 2b and the end section 20 of the separator 3c together, the same glass bonding plate 12 as that in the first example was applied, and the three-layered film 2b and the separator 3c were joined by the heat-treatment while applying a load, and thus, a cell 1b was fabricated. A cell stack (not shown in the drawing) was structured similarly to the first example to fabricate a solid-electrolyte fuel cell.

Next, the solid-electrolyte fuel cell was operated, and from the galvanic characteristics during the operation, it was confirmed whether or not gas leakage occurred between the three-layered film 2b and the end of the separator 3c. Also, after the operation, whether or not the three-layered film 2b and the end of the separator 3c had separated was visually confirmed.

COMPARATIVE EXAMPLE 2

Figure 6:
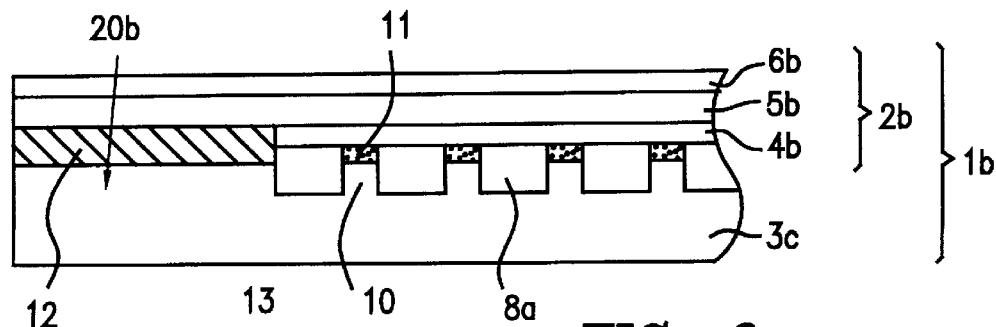
FIG. 6 is a partial sectional view showing the bonding state between a three-layered film and a separator in accordance with a second comparative example.

FIG. 6 is a partial sectional view of a cell in accordance with a second comparative example. A three-layered film 2b including an air electrode 4b, a solid-electrode film 5b and a fuel electrode 6b, and a separator 3c were prepared similarly to the first example. In order to join the air electrode 4b of the three-layered film 2b and a conductive section 10 of the separator 3c together, the same conductive oxide 11 as that in the first example was screen-printed onto the conductive section 10. Also, in order to join the three-layered film 2b and the end section 20 of the separator 3c together, the same ceramic bonding agent as that in the first example was screen-printed, and the three-layered film 2b and the separator 3c were joined by heat-treatment while applying a load, and thus, a cell 1b was fabricated. A cell stack (not shown in the drawing) was structured similarly to the first example to fabricate a solid-electrolyte fuel cell.

Next, the solid-electrolyte fuel cell was operated, and from the galvanic characteristics during the operation, it was confirmed whether or not gas leakage occurred between the three-layered film 2b and the end of the separator 3c. Also, after the operation, whether or not the three-layered film 2b and the end of the separator 3c had separated was visually confirmed.

Table 1 shows the results of separation and gas leakage between the three-layered film and the end of the separator with respect to the examples 1 and 2 and the comparative examples 1 and 2.

TABLE 1

| | Bonding Area/Material | | Bonding Results | |
|---|---|---|---|---|
| | Exterior | Interior | Separation | Gas |
| Example 1 | Glass | Ceramic | None | None |
| Example 2 | Ceramic | Glass | None | None |
| Comparative Example 1 | Glass | | Observed | Observed |
| Comparative Example 2 | Ceramic | | None | Observed |

As is clear from Table 1, since the glass bonding agent and the ceramic bonding agent were placed in parallel between the three-layered film and the end of the separator to bond them together in the examples 1 and 2, the sealing of gas by the glass bonding agent and the bonding by the ceramic bonding agent functioned independently. As a result, the three-layered film and the end of the separator did not separate because of the bonding function of the ceramic bonding agent, and no gas leakage occurred because of the gas-sealing function of the glass bonding agent. Although in accordance with these examples, a groove was provided on the end of the separator to isolate the glass bonding agent from the ceramic agent, the same advantage can be obtained without providing a groove if the glass bonding agent and the ceramic bonding agent are placed in parallel with a distance therebetween so as not to be mixed with each other during bonding.

On the other hand, since the three-layered film and the end of the separator were bonded together with the glass bonding agent in the comparative example 1, the bonding power was weak. Thus, the three-layered film and the end of the separator separated, resulting in gas leakage. In the comparative example 2, although the bonding power was strong because of the use of the ceramic bonding agent, the ability to seal gas was weak because the glass bonding agent was not used, and this resulted in gas leakage.

It is to be understood that the solid-electrolyte fuel cell in accordance with the present invention is not limited to the examples described above. Although in the examples, the glass bonding agent and the ceramic bonding agent were placed in parallel between the air electrode of the three-layered film and the end of the separator for bonding, the same advantage can be obtained if the glass bonding agent and the ceramic bonding agent are placed in parallel between the fuel electrode of the three-layered film and the end of the separator for bonding. Any conventional glass or ceramic bonding agent, electrode, electrolyte, etc. can be employed.

While preferred embodiments of the invention have been disclosed, various modes of carrying out the principles disclosed herein are contemplated as being within the scope of the following claims. Therefore, it is understood that the scope of the invention is not to be limited except as otherwise set forth in the claims.

What is claimed is:

1. A solid-electrolyte fuel cell comprising:
   a three-layered film comprising a solid-electrolyte film, a fuel electrode and an air electrode in which the solid-electrolyte film is interposed between the fuel electrode and the air electrode;
   a separator having a surface which is bonded to a surface of the three-layered film;
   a glass bonding agent; and
   a ceramic bonding agent;
   wherein the glass bonding agent and ceramic bonding agents are disposed at different points along the bonded surface of the three-layer film and separator.

2. A solid-electrolyte fuel cell according to claim 1, wherein the separator has a groove at a peripheral section thereof such that the groove divides the peripheral section into an inside section and an outside section, and one of the glass bonding agent and the ceramic bonding agent is disposed at the inside section and the other is disposed at the outside section.

3. A solid electrolyte fuel according claim 2, wherein the air electrode of the three-layered film faces the separator and the solid-electrolyte extends beyond the air electrode and into the peripheral section.

4. A solid electrolyte fuel according to claim 3, wherein the glass bonding agent is disposed in the inside section.

5. A solid electrolyte fuel according to claim 3, wherein the ceramic bonding agent is disposed in the inside section.

6. A cell stack comprising at least two superposed solid electrolyte fuel cells according to claim 3 and an electrically conductive layer therebetween.

7. A cell stack according to claim 6 in which the electrically conductive layer is disposed between the separator of one fuel cell and the fuel electrode of a second cell.

8. A cell stack according to claim 7, wherein the glass bonding agent is disposed in the inside section.

9. A cell stack according to claim 7, wherein the ceramic bonding agent is disposed in the inside section.

10. A solid electrolyte fuel according to claim 2, wherein the glass bonding agent is disposed in the inside section.

11. A solid electrolyte fuel according to claim 2, wherein the ceramic bonding agent is disposed in the inside section.

12. A cell stack comprising at least two superposed solid electrolyte fuel cells according to claim 2 and an electrically conductive layer therebetween.

13. A cell stack according to claim 12 in which the electrically conductive layer is disposed between the separator of one fuel cell and the fuel electrode of a second cell.

14. A cell stack according to claim 13, wherein the glass bonding agent is disposed in the inside section.

15. A cell stack according to claim 13, wherein the ceramic bonding agent is disposed in the inside section.

16. A cell stack comprising at least two superposed solid electrolyte fuel cells according to claim 1 and an electrically conductive layer therebetween.

* * * * *